3,489,597
POLYESTER - CELLULOSIC POLYMER - VINYL-PYRROLIDONE - VINYL ACETATE POLYMER IMAGE-RECEIVING SHEET MATERIALS
Konrad Parker, Park Ridge, Ill., assignor to Addressograph-Multigraph Corporation, Cleveland, Ohio, a corporation of Delaware
No Drawing. Filed Jan. 20, 1966, Ser. No. 521,806
Int. Cl. B44d 1/16; C08d 13/16
U.S. Cl. 117—73                                5 Claims

ABSTRACT OF THE DISCLOSURE

Image-receiving materials, capable of accepting printing inks, are formed of a polyester sheet material coated with a cellulosic film-forming polymer and another top coating of a vinylpyrrolidone-vinyl acetate copolymer.

---

This invention relates to imaging materials generally and, more particularly, to a treating agent which when applied to plastic surfaces improves the ink receptivity and ink adhesive properties thereof.

Plastic surfaces generally present a poor or totally unsuitable surface for imaging with ink. Inks are generally unable to wet plastic surfaces. Thus, a discontinous film or ink line is produced. In addition, an ink image on plastic surfaces will readily peel or flake off. Poor ink adhesion on plastic surfaces is a problem in many fields including packaging and is particularly troublesome in the drafting field where plastic films, plastic coated drafting cloths, etc., are commonly imaged with India ink or the like.

Plastic materials fall into two classes, those which require a pre-coating in order to accept ink and those which will accept the application of ink directly to the surface. An example of the former class of plastic materials is a lacquer-coated plastic base of heat-set and biaxially oriented linear terephthalic acid-ethylene glycol polyester, sold under the trademark "Mylar." It has been found that polyester bases generally require a lacquer pre-coating. Some plastic base members can be imaged directly without a larquer coating, although the ink receptivity is usually poor.

The lacquer pre-coat which has usually been employed heretofore is a cellulosic film-forming polymer such as, for example, nitrocellulose, ethylcellulose, cellulose acetate, cellulose acetate propionate, or cellulose acetate butyrate, dissolved in suitable solvents such as, for example, methyl ethyl ketone, ethyl acetate, methyl isobutyl ketone, toluene, etc. Included in the lacquer coating may be a plasticizer such as an alkyd resin or phthalate ester. In addition, a hardener such as urea-formaldehyde resin may also be added. This lacquer coating may vary in thickness from 0.2 to 1.0 mil depending on the end use of the plastic media.

In order to provide a matte finish, suitable for marking with pencil, the lacquer coating may include a finely divided pigment such as amorphous or diatomaceous silica. Titanium dioxide may also be added to impart a white background color.

A serious failing of such heretofore known lacquered surfaces is that they exhibit poor ink receptivity. As already indicated, poor ink receptivity is common to plastic materials generally. The ink indicia tends to feather so that it is difficult to draw sharp, well defined lines. The ink tends to accumulate in excess amounts at the beginning of the writing or drawing at stoppage points or slow down in writing such that small globules of ink form at these points. This is particularly undesirable in engineering documents. In addition, the ink image is not firmly affixed to the plastic surface. This can be readily demonstrated by an adhesion test in which a piece of pressure sensitive tape is placed across an ink-imaged area. Rapid as well as slow peeling of the tape from the imaged area will remove most of the ink image. In addition to being readily removed with pressure-sensitive tape, the ink will flake off when the plastic member is creased across the ink image. Ink images in the past have not lent themselves to correction with a type of erasing knife which chipped off uncontrolled portions of the image rather than deleted only specific portions. Thus, ragged, bordering edges result.

In addition to the polyester and cellulosic plastics, other plastics such as, for example, vinyls, polyurethanes, alkyds, polycarbonates, polystyrenes, acrylics, phenolics, and melamines generally have poor ink-receptive surfaces.

According to this invention the aforementioned plastic surfaces are rendered ink-receptive by treating the plastic surface with a copolymer of vinyl acetate and vinylpyrrolidone. The resulting plastic surface has greatly improved ink-receptive properties and the ink image is well defined and adheres firmly to the surface. An ink image on a treated plastic surface is not readily removed with pressure-sensitive tape nor does it exhibit the aforementioned poor ink-receptive properties.

It is a general object of this invention to provide an improved imaging material capable of accepting ink indicia.

It is another object of this invention to provide an improved method and materials for treating a plastic surface to render it ink-receptive so that an ink image thereon will be readily and firmly affixed thereto.

In achieving the objects of this invention a treating agent dissolved in an organic solvent or dispersed in an aqueous emulsion consisting of a copolymer of vinyl acetate and vinylpyrrolidone is applied to a plastic surface. When pencil marking is a consideration it has been found that the treating agent should be applied in as thin a layer as possible in order not to interfere with the matte finish or "tooth" which may be included in the image-receiving surface. It should be noted that the treating agent does not affect the appearance of the image-receiving material surface.

In a solvent system the vehicle should be selected so that it will not dissolve or soften the plastic surface. Such suitable vehicles would be isopropyl alcohol, toluene, ethyl acetate or mixtures thereof.

The concentration of the copolymer in the treating agent is not critical and may vary from about 1% to about 20% by weight, depending on coating equipment and conditions. The optimum level of the vinylpyrrolidone component of the treating agent will vary depending upon the plastic surface being treated. The range of the polyvinylpyrrolidone component in the copolymer can be from about 5% to about 55%, preferably 10% to 35%, by weight of the copolymer, the remainder being polyvinyl acetate.

The following plastic surfaces when treated in accordance with this invention exhibited improved ink-receptive properties: cellulose acetate, cellulose nitrate, cellulose acetate butyrate, cellulose acetate propionate, polyvinylidene chloride, polyvinyl chloride, polyurethane, polystyrene, polymethyl methacrylate ("Plexiglas"), acrylonitrile-butadienestyrene, phenol-formaldehyde, melamine laminate ("Formica"), polyester and polycarbonate.

The polyester and polycarbonate, if etched before treating with the copolymer of this invention in accordance with well known etching techniques such as, for example, exposing the surface to an electrical discharge, will exhibit even greater ink receptivity.

The mechanism by which the treating agent acts to improve ink receptivity is not clearly understood. The agent may act as a bonding agent which firmly fixes the ink image to the plastic surface and/or may act as a wetting agent which renders the surface layer ink-receptive.

The treating agent can be applied to the surface of the plastic by any known coating techniques such as, for example, roller or bead coating followed by air or oven drying. It can also be applied merely by swabbing the surface with a cloth saturated with a solution of the treating agent. The amount of treating agent applied to the plastic surface is not a critical factor. Preferably the amount should be in the range of 0.5–10.0 grams per square meter, however, the range can be as broad as 0.3–15.0 grams per square meter.

The following examples describe in detail the method and materials that comprise the present invention and are intended to be illustrative of said invention and not limiting thereof. The practice of this invention is described in detail by examples of the various treating solutions that may be employed to produce a finished ink-receiving surface. It is to be understood that this invention is not limited to the treatment of the plastic surfaces mentioned in the following examples but will improve the ink-receptive properties of numerous plastics as already indicated. The attention to detail presented in the description is intended to be exemplary of the techniques and formulations, and not restrictive of the invention which is defined in the appended claims.

EXAMPLE 1

A treating solution was prepared by mixing 3 parts by weight of a 55% copolymer ethylacetate toluene solution, the copolymer consisting of 10% by weight of the vinylpyrrolidone component and 90% by weight of the vinyl acetate component ("Kolima–10," marketed by the General Aniline and Film Corporation, Dyestuff and Chemical Division, New York, N.Y.) into 97 parts of isopropyl alcohol with agitation.

The solution was applied by roller coating in conjunction with an air knife in order to obtain a thin uniform film on the surface of a cellulose acetate butyrate-lacquered polyester base film. The coating was then dried by passing the web through an oven at 180° F.

EXAMPLE 2

A treating solution similar to Example 1 was applied to the surface of a cellulose acetate propionate-lacquered polyester base film comprising a 50% copolymer isopropanol solution, with the exception that the copolymer consisted of 35% by weight of the vinylpyrrolidone component and 65% by weight of the vinyl acetate component ("Kolima–35," marketed by General Aniline and Film Corporation).

EXAMPLE 3

A 10% (by weight) copolymer solids aqueous emulsion, the copolymer consisting of 25% by weight of the vinylpyrrolidone component and 75% by weight of the vinyl acetate component ("Polectron–825," General Aniline and Film Corporation) was applied to a nitrocellulose-lacquered polyester film and dried.

EXAMPLE 4

A 10% (by weight) copolymer solids aqueous emulsion, the copolymer consisting of 45% by weight of the vinylpyrrolidone component and 55% by weight of the vinyl acetate component ("Polectron–845," General Aniline and Film Corporation) was applied to a cellulose acetate butyrate-lacquered polyester base film and dried.

EXAMPLE 5

A treating agent was prepared by mixing with agitation 100 parts by weight of a 55% copolymer ethyl acetate toluene solution, the copolymer consisting of 10% by weight of the vinylpyrrolidone component and 90% by weight of the vinyl acetate component ("Kolima–10," marketed by General Aniline and Film Corporation) with 700 parts by weight of isopropyl alcohol, 150 parts by weight of ethyl acetate and 10 parts by weight of micronized silica. This solution was coated on a pre-treated "Mylar" polyester surface by roller coating and air knife techniques and then dried in an oven at 225° F.

The ink images on each of the treated surfaces of the foregoing examples adhered firmly thereto. Adhesion tests as previously described wherein a pressure sensitive tape is pressed onto the image and removed therefrom left the ink image undisturbed.

I claim:
1. An image-receiving material for receiving ink markings thereon, comprising a polyester base support material which has applied thereon a coating consisting essentially of a cellulosic film-forming polymer having applied thereon a top coating of a solid continuous copolymer consisting of a vinylpyrrolidone component and vinyl acetate component wherein said vinylpyrrolidone component comprises 5%–55% by weight of said copolymer.

2. An image-receiving material as defined by claim 1 wherein the amount of top coating applied is in the range of from 0.3 to 15 grams per square meter.

3. The image-receiving material as claimed in claim 1 wherein the cellulosic film-forming polymer is a material selected from the group consisting of cellulose acetate, cellulose nitrate, cellulose acetate butyrate, and cellulose, acetate propionate.

4. The image-receiving material as defined by claim 1 wherein the copolymer consists of 25% by weight of vinylpyrrolidone component and 75% by weight of the vinyl acetate component.

5. An image-receiving material as defined by claim 1 wherein the copolymer comprises 90% by weight of vinyl acetate and 10% by weight vinylpyrrolidone.

References Cited

UNITED STATES PATENTS

| | | | |
|---|---|---|---|
| 2,808,383 | 10/1957 | Fikentscher et al. | 117—161 X |
| 2,901,457 | 8/1959 | Stoner et al. | 117—145 X |
| 2,958,614 | 11/1960 | Perry | 117—161 X |
| 3,061,569 | 10/1962 | Stoner et al. | 117—145 X |
| 3,097,144 | 7/1963 | Banker | 117—161 X |
| 3,115,420 | 12/1963 | Centa et al. | 117—76 X |
| 3,166,525 | 1/1965 | Perry | 117—161 X |
| 3,336,156 | 8/1967 | Gannon | 117—161 X |

FOREIGN PATENTS 657,177  2/1963  Canada.

WILLIAM D. MARTIN, Primary Examiner

J. E. MILLER, JR., Assistant Examiner

U.S. Cl. X.R.

117—138.8, 145, 161